United States Patent
Diab (10) Patent No.: US 8,214,665 B2
(45) Date of Patent: Jul. 3, 2012

(54) METHOD AND SYSTEM FOR TRANSMIT QUEUE MANAGEMENT FOR ENERGY EFFICIENT NETWORKING

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 489 days.

(21) Appl. No.: 12/483,969

(22) Filed: Jun. 12, 2009

(65) Prior Publication Data

US 2010/0235653 A1 Sep. 16, 2010

Related U.S. Application Data

(60) Provisional application No. 61/159,717, filed on Mar. 12, 2009.

(51) Int. Cl.
*G06F 1/26* (2006.01)

(52) U.S. Cl. ......................... 713/300; 713/320

(58) Field of Classification Search .................. 713/300, 713/320
See application file for complete search history.

(56) References Cited

U.S. PATENT DOCUMENTS

| | | | | |
|---|---|---|---|---|
| 5,784,559 A * | 7/1998 | Frazier et al. | ................. | 370/522 |
| 6,085,325 A * | 7/2000 | Jackson et al. | ................. | 713/300 |
| 6,233,235 B1 * | 5/2001 | Burke et al. | ..................... | 370/356 |
| 6,633,987 B2 * | 10/2003 | Jain et al. | ..................... | 713/300 |
| 6,912,596 B2 * | 6/2005 | Skidmore et al. | ................. | 710/1 |
| 7,007,180 B2 * | 2/2006 | Hashimoto | .................. | 713/320 |
| 7,075,903 B1 * | 7/2006 | Solum | ............................ | 370/311 |
| 7,392,412 B1 * | 6/2008 | Lo | ................................. | 713/320 |
| 7,971,083 B2 * | 6/2011 | Aoki et al. | ..................... | 713/320 |
| 2005/0030808 A1 * | 2/2005 | Brown et al. | ................. | 365/222 |
| 2006/0034295 A1 | 2/2006 | Cherukuri et al. | | |
| 2007/0094525 A1 * | 4/2007 | Uguen et al. | ................. | 713/300 |
| 2007/0238437 A1 * | 10/2007 | Jaakkola | ..................... | 455/343.1 |
| 2007/0280239 A1 | 12/2007 | Lund | | |
| 2008/0225841 A1 | 9/2008 | Conway et al. | | |
| 2009/0164817 A1 * | 6/2009 | Axford et al. | ................. | 713/322 |

(Continued)

FOREIGN PATENT DOCUMENTS

EP 1 473 870 11/2004

(Continued)

OTHER PUBLICATIONS

Teener, "Audio/Video Bridging for Home Networks (IEEE 802.1 AV Bridging Task Group)" [Online] Jun. 1, 2007, http://www.ieee802.org/3/eee_study/public/jul07/teener_1_0707.pdf.
Grow, "802.1 and Energy Efficient Ethernet." Sep. 11, 2007, pp. 1-6, XP002509616.
Bennett et al., "Energy Efficient Ethernet." Jul. 16, 2007, pp. 1-70, XP002509615.

(Continued)

*Primary Examiner* — Nitin Patel
(74) *Attorney, Agent, or Firm* — Duane S. Kobayashi (57) ABSTRACT

Aspects of a method and system for queue management for energy efficient networking are provided. In various embodiments of the invention a network device may determine whether to transition into or out-of an energy-saving mode of operation, and arm an EEN trigger by buffering the EEN trigger in a queue and/or setting one or more flags. The network device may transition into or out-of the energy-saving mode upon the EEN trigger being read from the queue or upon the queue becoming empty while the trigger is armed. Upon the occurrence of an event meeting one or more criteria prior to the EEN trigger being read from the queue or prior to the queue being empty, the EEN trigger may be disarmed. The network device may disarm the EEN trigger by deleting the EEN trigger from the queue and/or by resetting the flag.

22 Claims, 7 Drawing Sheets

U.S. PATENT DOCUMENTS

2010/0128738 A1  5/2010  Barrass

FOREIGN PATENT DOCUMENTS

| EP | 1 484 876 | 12/2004 |
| EP | 1 494 407 | 1/2005 |
| GB | 2 337 672 | 11/1999 |
| WO | WO 00/31923 | 6/2000 |

OTHER PUBLICATIONS

Gupta et al., "Dynamic Ethernet Link Shutdown for Energy Conservation on Ethernet Links." XP-002524616, pp. 6156-6161, 2007.

Wael Diab, "Energy Efficient Ethernet and 802.1." IEEE 802 Plenary, Nov. 16, 2007, XP-002524617.

* cited by examiner

FIG. 4

METHOD AND SYSTEM FOR TRANSMIT QUEUE MANAGEMENT FOR ENERGY EFFICIENT NETWORKING

CROSS-REFERENCE TO RELATED APPLICATIONS/INCORPORATION BY REFERENCE

This patent application makes reference to, claims priority to and claims benefit from U.S. Provisional Patent Application Ser. No. 61/157,450 filed on Mar. 4, 2009.

The above stated application is hereby incorporated herein by reference in its entirety.

FIELD OF THE INVENTION

Certain embodiments of the invention relate to networking. More specifically, certain embodiments of the invention relate to a method and system for queue management for energy efficient networking.

BACKGROUND OF THE INVENTION

Communications networks and in particular Ethernet networks, are becoming an increasingly popular means of exchanging data of various types and sizes for a variety of applications. In this regard, Ethernet networks are increasingly being utilized to carry voice, data, and multimedia traffic. Accordingly more and more devices are being equipped to interface to Ethernet networks. Broadband connectivity including internet, cable, phone and VOIP offered by service providers has led to increased traffic and more recently, migration to Ethernet networking. Much of the demand for Ethernet connectivity is driven by a shift to electronic lifestyles involving desktop computers, laptop computers, and various handheld devices such as smart phones and PDA's. Applications such as search engines, reservation systems and video on demand that may be offered at all hours of a day and seven days a week, have become increasingly popular.

These developments have led to increased demand on datacenters, aggregation, high performance computing (HPC) and core networking. As the number of devices connected to data networks increases and higher data rates are required, there is a growing need for new transmission technologies which enable higher data rates. Conventionally, however, increased data rates often results in significant increases in power consumption. In this regard, as an increasing number of portable and/or handheld devices are enabled for Ethernet communications, battery life may be a concern when communicating over Ethernet networks. Accordingly, ways of reducing power consumption when communicating over Ethernet networks may be needed.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for queue management for energy efficient networking, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings,

DETAILED DESCRIPTION OF THE INVENTION

Certain embodiments of the invention may be found in a method and system for queue management for energy efficient networking. In various embodiments of the invention, a network device may determine whether to transition into or out-of an energy-saving mode of operation, and arm an EEN trigger by buffering the EEN trigger in a queue and/or setting one or more flags. The network device may transition into or out-of the energy-saving mode upon the EEN trigger being read from the queue or upon the queue becoming empty while the trigger is armed. Upon the occurrence of an event meeting one or more criteria prior to the EEN trigger being read from the queue or prior to the queue being empty, the EEN trigger may be disarmed. The network device may disarm the EEN trigger by deleting the EEN trigger from the queue and/or by resetting the flag. The event may comprises data to-be-transmitted being added to the queue subsequent to the EEN trigger being armed but prior to the EEN trigger being read from the queue or the queue becoming empty. The EEN trigger may comprise a packet or packets and/or a portion of a packet or packets. Additionally (or alternatively) one or more packets, or portions thereof, already buffered in the queue may be modified to comprise the EEN trigger. The queue may be integrated within a PHY of the network device. The queue may comprise a transmit queue or a dedicated event queue.

Whether to transition into or out-of the energy-saving mode may be determined based a value of one or more timers within the network device. Whether to transition into or out-of the energy-saving mode may be determined based on one or more of: a type of information communicated to and/or from the network device, an amount of time since the network device received data, an amount of time since the network device transmitted data, applications running on the network device, and/or a time until a next transmission and/or reception by the network device. The energy-saving mode may comprise a low power idle mode and/or a sub-rating mode in which the network device may communicate less than a negotiated maximum data rate.

Figure 1:
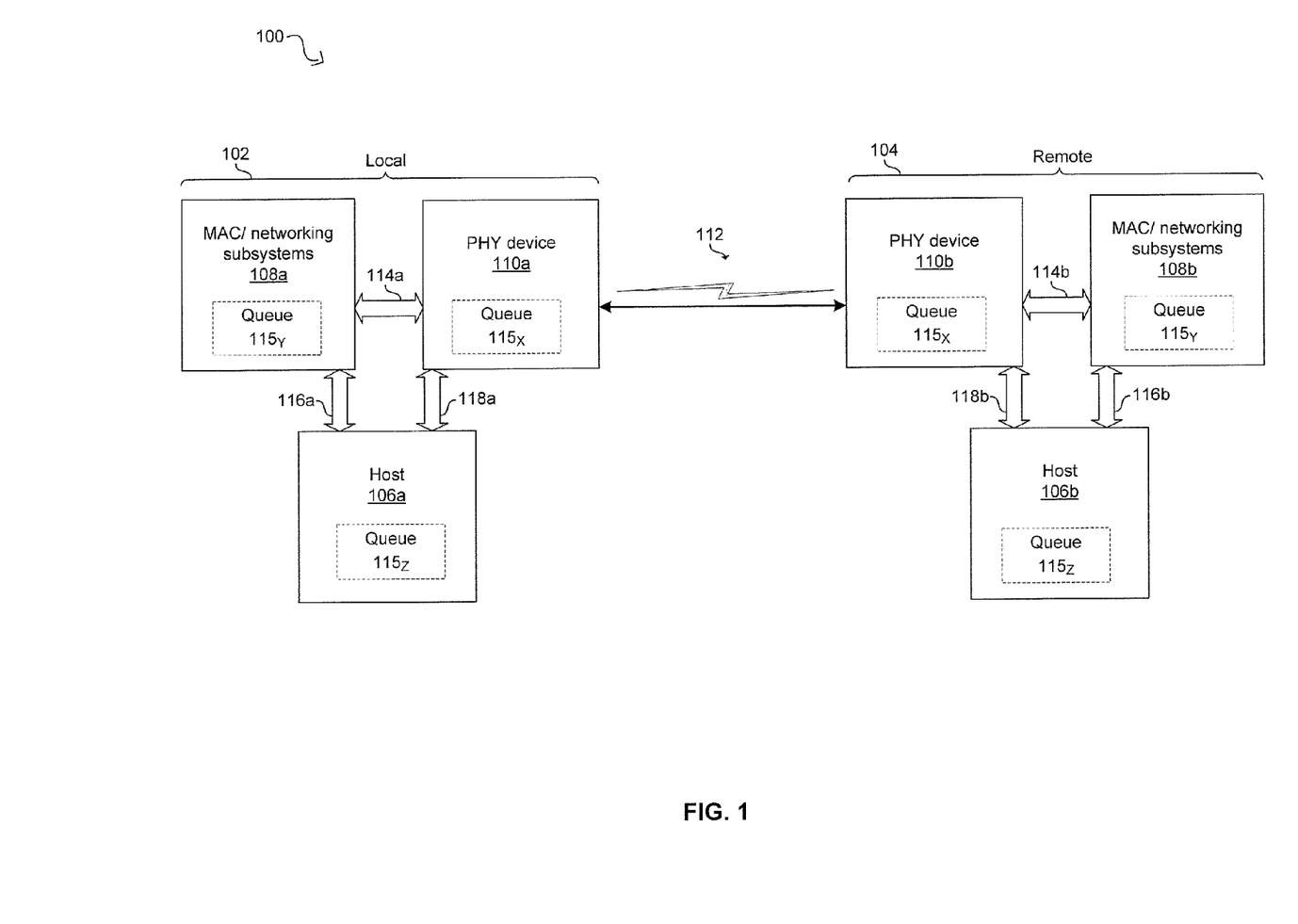
FIG. 1 is a functional block diagram illustrating an exemplary Ethernet connection between two network devices, which may be utilized for queue management for energy efficient networking, in accordance with an embodiment of the invention.

FIG. 1 is a functional block diagram illustrating an exemplary Ethernet connection between two network devices, which may be utilized for queue management for energy efficient networking, in accordance with an embodiment of the invention. Referring to FIG. 1, there is shown a system 100 that comprises a network device 102 and a network device 104. The network devices 102 and 104 may be link partners that communicate via the link 112 and may comprise, respectively, hosts 106a and 106b, networking subsystems 108a and 108b, PHY devices 110a and 110b, interfaces 114a and 114b, interfaces 116a and 116b, and interfaces 118a and 118b. The interfaces 114a and 114b are referenced collectively or separately herein as interface(s) 114, and the interfaces 116a and 116b are referenced collectively or separately herein as interface(s) 116. The hosts 106a and 106b are referenced collectively or separately herein as host(s) 106. The networking subsystems 108a and 108b are referenced collectively or separately herein as networking subsystem(s) 108. The PHY devices 110a and 110b are referenced collectively or separately herein as PHY device(s) 106.

The link 112 is not limited to any specific medium. Exemplary link 112 media may comprise copper, wireless, optical and/or backplane technologies. For example, a copper medium such as STP, Cat3, Cat 5, Cat 5e, Cat 6, Cat 7 and/or Cat 7a as well as ISO nomenclature variants may be utilized. Additionally, copper media technologies such as InfiniBand, Ribbon, and backplane may be utilized. With regard to optical media for the link 112, single mode fiber as well as multimode fiber may be utilized. With regard to wireless, the network devices 102 and 104 may support one or more of the 802.11 family of protocols. In various embodiments of the invention, the network device 102 and the network device 104 may communicate via two or more physical channels comprising the link 112. For example, Ethernet over twisted pair standards 10 BASE-T and 100 BASE-TX may utilize two pairs of UTP while Ethernet over twisted pair standards 1000 BASE-T and 10 GBASE-T may utilize four pairs of UTP.

The network devices 102 and/or 104 may comprise, for example, switches, routers, end points, computer systems, audio/video (A/V) enabled equipment, or a combination thereof. Additionally, the network devices 102 and 104 may be enabled to utilize Audio/Video Bridging and/or Audio/video bridging extensions (collectively referred to herein as audio video bridging or AVB) for the exchange of multimedia content and associated control and/or auxiliary data. Also, the network devices may be operable to implement security protocols such IPsec and/or MACSec.

The hosts 106a and 106b may be operable to handle functionality of OSI layer 3 and above in the network devices 102 and 104, respectively. The hosts 106a and 106b may be operable to perform system control and management, and may comprise hardware, software, or a combination thereof. The hosts 106a and 106b may communicate with the networking subsystems 108a and 108b via interfaces 116a and 116b, respectively. The hosts 106a and 106b may additionally exchange signals with the PHY devices 110a and 110b via interfaces 118a and 118b, respectively. The interfaces 116a and 116b may correspond to PCI or PCI-X interfaces. The interfaces 118a and 118b may comprise one or more discrete signals and/or communication busses. In various embodiments of the invention, one or both of the hosts 106 may comprise one or more queues $115_Z$ for buffering received and/or to-be-transmitted data.

The networking subsystems 108a and 108b may comprise suitable logic, circuitry, and/or code that may be operable to handle functionality of OSI layer 2 and above layers in the network device 102 and 104, respectively. In this regard, networking subsystems 108 may each comprise a media access controller (MAC) and/or other networking subsystems. Each networking subsystem 108 may be operable to implement switching, routing, and/or network interface card (NIC) functions. Each networking subsystems 108a and 108b may be operable to implement Ethernet protocols, such as those based on the IEEE 802.3 standard, for example. Notwithstanding, the invention is not limited in this regard. The networking subsystems 108a and 108b may communicate with the PHY devices 110a and 110b via interfaces 114a and 114b, respectively. The interfaces 114a and 114b may correspond to Ethernet interfaces that comprise protocol and/or link management control signals. The interfaces 114a and 114b may be, for example, multi-rate capable interfaces and/or media independent interfaces (MII). In various embodiments of the invention, one or both of the networking subsystems 108 may comprise one or more queues $115_Y$ for buffering received and/or to-be-transmitted data.

The PHY devices 110 may each comprise suitable logic, circuitry, interfaces, and/or code that may enable communication between the network device 102 and the network device 104. Each of the PHY devices 110 may be referred to as a physical layer transmitter and/or receiver, a physical layer transceiver, a PHY transceiver, a PHYceiver, or simply a PHY. The PHY devices 110a and 110b may be operable to handle physical layer requirements, which include, but are not limited to, packetization, data transfer and serialization/deserialization (SERDES), in instances where such an operation is required. Data packets received by the PHY devices 110a and 110b from networking subsystems 108a and 108b, respectively, may include data and header information for each of the above six functional OSI layers. The PHY devices 110a and 110b may be configured to convert packets from the networking subsystems 108a and 108b into physical layer signals for transmission over the physical link 112, and convert received physical signals in into digital information. In some embodiments of the invention, the PHY devices 110 may comprise suitable logic, circuitry, and/or code operable to implement MACSec. In various embodiments of the invention, one or both of the PHY devices 110 may comprise one or more queues $115_X$ for buffering receiving and/or to-be-transmitted data.

One or both of the PHY devices 110 may comprise a twisted pair PHY capable of operating at one or more standard rates such as 10 Mbps, 100 Mbps, 1 Gbps, and 10 Gbps (10 BASE-T, 100 GBASE-TX, 1 GBASE-T, and/or 10 GBASE-T); potentially standardized rates such as 40 Gbps and 100 Gbps; and/or non-standard rates such as 2.5 Gbps and 5 Gbps. One or both of the PHY devices 110 may comprise a backplane PHY capable of operating at one or more standard rates such as 10 Gbps (10 GBASE-KX4 and/or 10 GBASE-KR); and/or non-standard rates such as 2.5 Gbps and 5 Gbps. One or both of the PHY devices 110 may comprise an optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY. One or both of the PHY devices 110 may support multi-lane topologies such as 40 Gbps CR4, ER4, KR4; 100 Gbps CR10, SR10 and/or 10 Gbps LX4 and CX4. Also, serial electrical and copper single channel technologies such as KX, KR, SR, LR, LRM, SX, LX, CX, BX10, LX10 may be supported. Non-standard speeds and non-standard technologies, for example, single channel, two channel or four channels may also be supported. More over, TDM technologies such as PON at various speeds may be supported by the PHY devices 110.

Also, the PHY devices 110 may support transmission and/or reception at a high(er) data in one direction and transmission and/or reception at a low(er) data rate in the other direction. For example, the network device 102 may comprise a multimedia server and a link partner may comprise a multimedia client. In this regard, the network device 102 may transmit multimedia data, for example, to the link partner at high(er) data rates while the link partner may transmit control or auxiliary data associated with the multimedia content at low(er) data rates. The network device 102 may also support wireless protocols such as the IEEE 802.11 family of standards.

In various embodiments of the invention, each of the PHY devices 110a and 110b may be operable to implement one or more energy efficient techniques, which may be referred to as energy efficient networking (EEN), or in the specific case of Ethernet, energy efficient Ethernet (EEE). For example, the PHY devices 110a and 110b may be operable to support low power idle (LPI) and/or subset PHY, also referred to as sub-rating, techniques. LPI may generally refer a family of techniques where, instead of transmitting conventional IDLE symbols during periods of inactivity, the PHY devices 110a and 110b may remain silent and/or communicate signals other than conventional IDLE symbols. Sub-rating, or sub-set PHY, may generally refer to a family of techniques where the PHYs are reconfigurable, in real-time or near real-time, to communicate at different data rates.

In operation, the network devices 102 and 104 may communicate via the link 112 and may utilize EEN techniques to reduce the energy consumption required for the communications. In this regard, each of the network devices 102 and 104 may implement an EEN control policy that may be utilized to determine when to transition into and out-of an energy-saving mode. The EEN control policy may be implemented by the host 106a, the networking subsystem 108a, the PHY 110a, or a combination thereof. Exemplary factors which may be considered when determining whether to transition into or out-of an energy-saving mode may comprise capacity and/or current usage of transmit or receive queues 115, type of information communicated between the network devices 102 and 104, time since the previous data reception and/or transmission, applications running on the network device 102 and/or 104, and time until the next transmission and/or reception. Time until the next transmission and/or reception may be predicted based on, for example, deterministic traffic patterns associated with certain data types and/or streams, statistical analysis of past traffic, explicit messages and/or control packets that identify active and/or inactive time intervals.

Transitions between modes of operation may be managed utilizing an EEN trigger and, in some instances, a status indicator of one or more of the transmit queues 115. In some instances, the EEN trigger may comprise, for example, a packet or header or portion of a packet; information appended to or inserted into a packet already buffered in a queue; or a distinct bit sequence or symbol, which may or may not be of the same length or format of a packet, and which may be a placeholder in the queue 115 that may prompt the device 102 to generate a physical layer signal upon being output from the queue 115. In other instances, the EEN trigger may be a discrete signal.

Upon deciding to transition into or out-of an energy-saving mode, the network device 102 may schedule the transition by "arming" an EEN trigger. Arming an EEN trigger may comprise, for example, buffering the EEN trigger in a transmit queue $115_X$, $115_Y$, and/or $115_Z$, buffering the EEN trigger in an event management queue (not shown), and/or setting a flag—which may comprise asserting or de-asserting one or more signals and/or bits in a register.

Once the EEN trigger is armed, the transition into or out-of an energy-saving mode may occur upon one or more of the transmit queues $115_X$, $115_Y$, and $115_Z$ becoming empty. However, while data continues to be transmitted and the transmit queue(s) 115 are emptying, an event may occur that would result in the scheduled transition to be inefficient. For example, a packet may arrive at the transmit queue which would cause a transition immediately out of the energy-saving mode and thus power expended to transition into and out-of the energy-saving mode may be higher than if no transition had occurred. In instances that such an event occurs, the EEN trigger may be disarmed and the transition may be preempted. In this regard, disarming the EEN trigger may comprise, for example, deleting the EEN trigger from a transmit queue or event management queue in which it is buffered and/or de-asserting a flag or one or more bits in a register.

Figure 2:
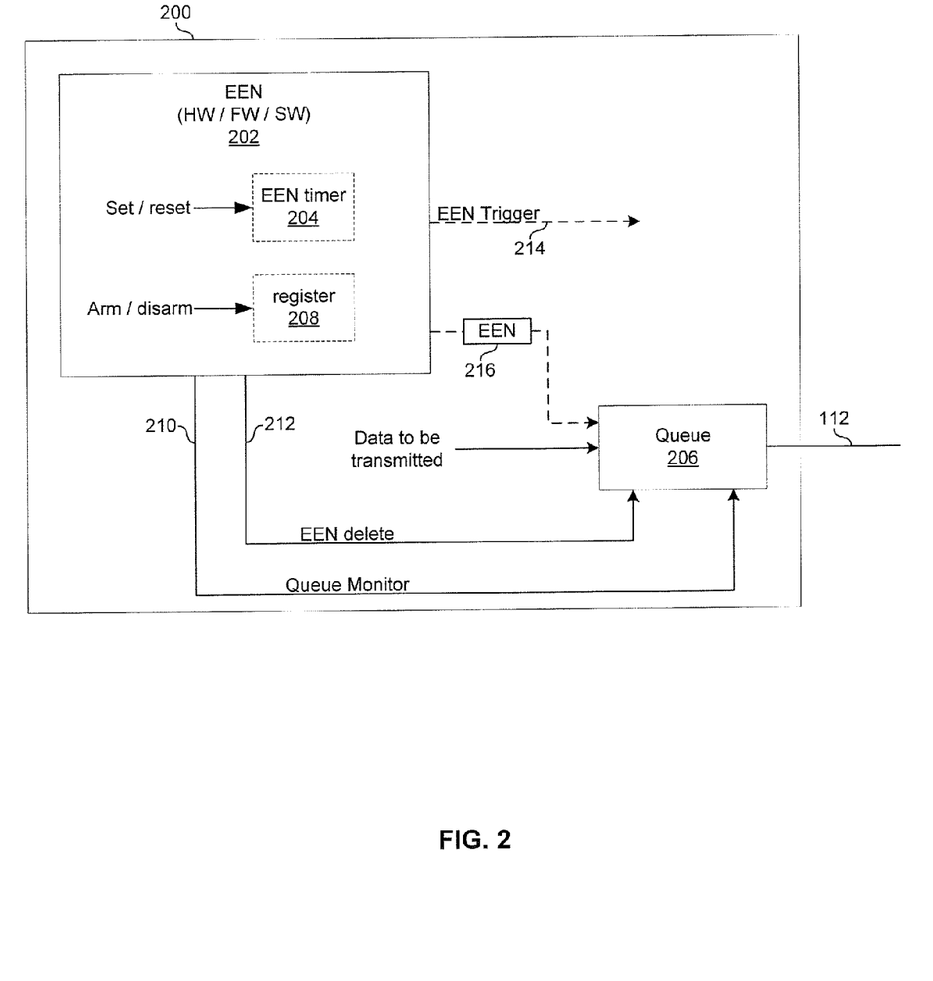
FIG. 2 is a block diagram illustrating a network device operable to manage the queuing of control packets to implement energy efficient networking (EEN), in accordance with an embodiment of the invention.

FIG. 2 is a block diagram illustrating a network device operable to monitor and manage a transmit queue for implementing energy efficient networking (EEN), in accordance with an embodiment of the invention. Referring to FIG. 2, there is shown a network device 200, which may be substantially similar to the network devices 102 and 104 described with respect to FIG. 1. The network device 200 may be, for example, a personal computer, a switch, a router, or a mobile device that is operable to implement one or more EEN protocols such as low power idle (LPI) or subset PHY. The device 200 may comprise an EEN module 202, a transmit queue 115, and a timer 204.

The transmit queue 206 may be similar to the queues $115_X$, $115_Y$, and/or $115_Z$, which are described with respect to FIG. 1. In this regard, the queue 206 may comprise memory operable to store information prior to transmitting the information over a physical medium. In various embodiments of the invention, memory may be dedicated to the transmit queue 206 or portions of a shared memory may be dynamically allocated to the transmit queue 206 based, for example, on an EEN control policy implemented by the network device 200.

The EEN module 202 may comprise suitable logic, circuitry, interfaces, and/or code that may be operable to implement EEN techniques and an associated EEN control policy. In this regard, the EEN module may: determine how and when to transition into and out-of an energy-saving mode, generate control signals to configure and/or control various portions of the device 202 for implementing EEN protocols, and/or generate EEN signals for communicating EEN information to a link partner. In various embodiments of the invention, the EEN module 202 may be implemented in hardware, firmware, and/or software in a host 106, a networking subsystem 108, a PHY 110, or a combination thereof. In this regard, software may be utilized to control hardware for the EEN module.

In some embodiments of the invention, the EEN module 202 may comprise a timer 204 which may be utilized to track one or more time intervals. For example, the timer 204 may track an amount of time that the network device 200 has been in an energy-saving mode, an amount of time that the network device 200 has been out of an energy-saving mode, an amount of time since traffic was last received, an amount of time since traffic was last transmitted, an amount of time until a transition into or out of an energy-saving mode, and/or an amount of time since a certain quantity of data in one or more queues such as queue 206 has reached a certain threshold or particular level.

In some embodiments of the invention, the EEN module 202 may comprise a register 208 that may be utilized to arm the EEN trigger. For example, the register may be a 1-bit register and when the bit is asserted the EEN trigger may be armed and when the bit is de-asserted the EEN trigger may be disarmed.

In operation, the EEN module 202 may decide to transition into an energy-saving mode and may schedule an EEN event accordingly. For example, the device 200 may determine that it should enter an energy-saving mode when no packets have been added to the transmit queue 206 for a period of time, as determined via the queue monitor signal 210.

In some embodiments of the invention, once a decision to transition into an energy-saving mode has been made, an EEN trigger may be armed by asserting a bit in the register 208 and the transition may be triggered by asserting the EEN trigger 214. In this regard, while the EEN trigger is armed, the EEN trigger 214 may be asserted when the queue 206 becomes empty (as indicated by the signal 210). Assertion of the EEN trigger 214 may, in turn, cause a transition to an energy-saving mode. However, while the EEN trigger is armed but the queue 206 is not yet empty, an event may occur that may make the transition to an energy-saving mode undesirable. If such an event does occur, then the scheduled transition may be cancelled and the EEN trigger may be disarmed by de-asserting the bit in the register 208. In this manner, by cancelling the transition to an energy-saving mode, the latencies and energy consumption associated with transitioning into and out-of the energy-saving mode may be avoided.

In other embodiments of the invention, once a decision to transition into an energy-saving mode has been made, an EEN trigger may be armed by buffering an EEN trigger 216 in the transmit queue 206. In such instances, the EEN trigger 216 may comprise a packet (or portion thereof buffered in the queue 206, and the EEN transition may be initiated when the EEN trigger 216 is read from the queue 206. However, while the EEN trigger 216 is propagating through the queue 206, an event may occur that may make the transition undesirable. If such an event does occur, then the scheduled transition may be cancelled and the EEN trigger may be disarmed by deleting the EEN trigger 216 from the queue 206. In this manner, by cancelling the transition to an energy-saving mode, the latencies and energy consumption associated with transitioning into and out-of the energy-saving mode may be avoided.

In other embodiments of the invention, once a decision to enter an energy-saving mode has been made, the EEN module 202 may arm the EEN trigger by setting the timer 204. The timer 204 may be set to an amount of time equal to the amount of time required for packets already in the queue to be transmitted. The time required for the queue to empty may be determined based on, for example, an anticipated traffic profile (i.e. egress data rate) on the link 106. In this regard, the traffic profile may be predicted based on, for example, one or more applications running on the device 200 and/or type(s) of traffic transmitted by the device 200. Accordingly, the EEN trigger 214 may be asserted and a transition into the energy-saving mode may be initiated when the timer 204 reaches the count set by the EEN module 202. Alternatively, if an event that makes the transition undesirable occurs before the timer 204 reaches the set count value, then the transition may be cancelled and the EEN trigger may be disarmed by resetting the counter. In this manner, by cancelling the transition to an energy-saving mode, the latencies and energy consumption associated with transitioning into and out of the energy-saving mode may be avoided.

Transitions out of an energy-saving mode may be scheduled and managed in a similar manner. In various embodiments of the invention, the timer 204 may be set to determine when the network device 200 is to transition out of the energy-saving mode. In instances where no event occurs prior to the timer 204 reaching the count value, then network device may transition out of the energy-saving mode. In instances when an event does occur, the timer 204 value may be reset. In this regard, the value of the timer 204 may be set based upon the amount of data stored in the queue 206 reaching a particular threshold. However, data being deleted from the queue may cause the timer to be reset or adjusted accordingly.

Figure 3A:
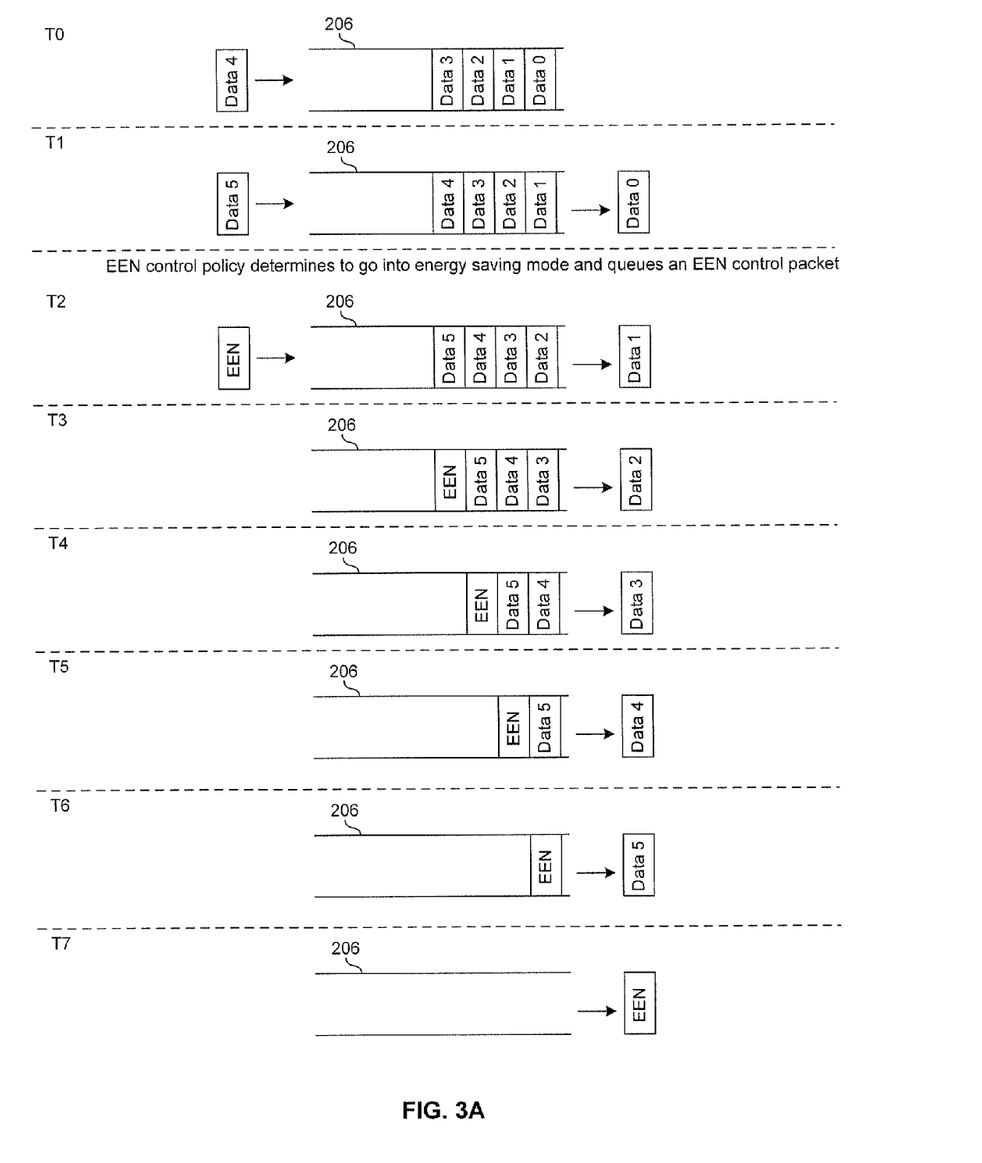
FIGS. 3A and 3B are block diagrams illustrating managing EEN transitions via a buffered EEN trigger, in accordance with an embodiment of the invention.

FIGS. 3A and 3B are block diagrams illustrating managing EEN transitions via a buffered EEN trigger, in accordance with an embodiment of the invention. Referring to FIG. 3A, there is shown the transmit queue 206 of the network device 200 during a series of time instants T0 to T7. At time instant T0, there may be some packets in the queue 206 and a new packet may arrive at the transmit queue 206. At time instant T1, a packet may be transmitted out of the transmit queue 206 and another data packet may arrive at the transmit queue 206. From time instant T1 until time instant T2, there may be no new data packets that arrive at the transmit queue 206. Accordingly, the EEN module 202, based on the EEN control policy, may determine to transition into an energy-saving mode. Accordingly, the transition may be scheduled and an EEN trigger may be placed in the transmit queue 206. From time instant T3 until time instant T7, no data packets may arrive at the transmit queue 206. Accordingly, at time instant T7 the EEN trigger may reach the end of the transmit queue 206 and a transition to an energy-saving mode may be initiated. In this regard, the EEN module 202 may initiate reconfiguration of the network device 200 and/or may initiate communication of one or more EEN packets and/or signals to one or more link partners.

Figure 3B:
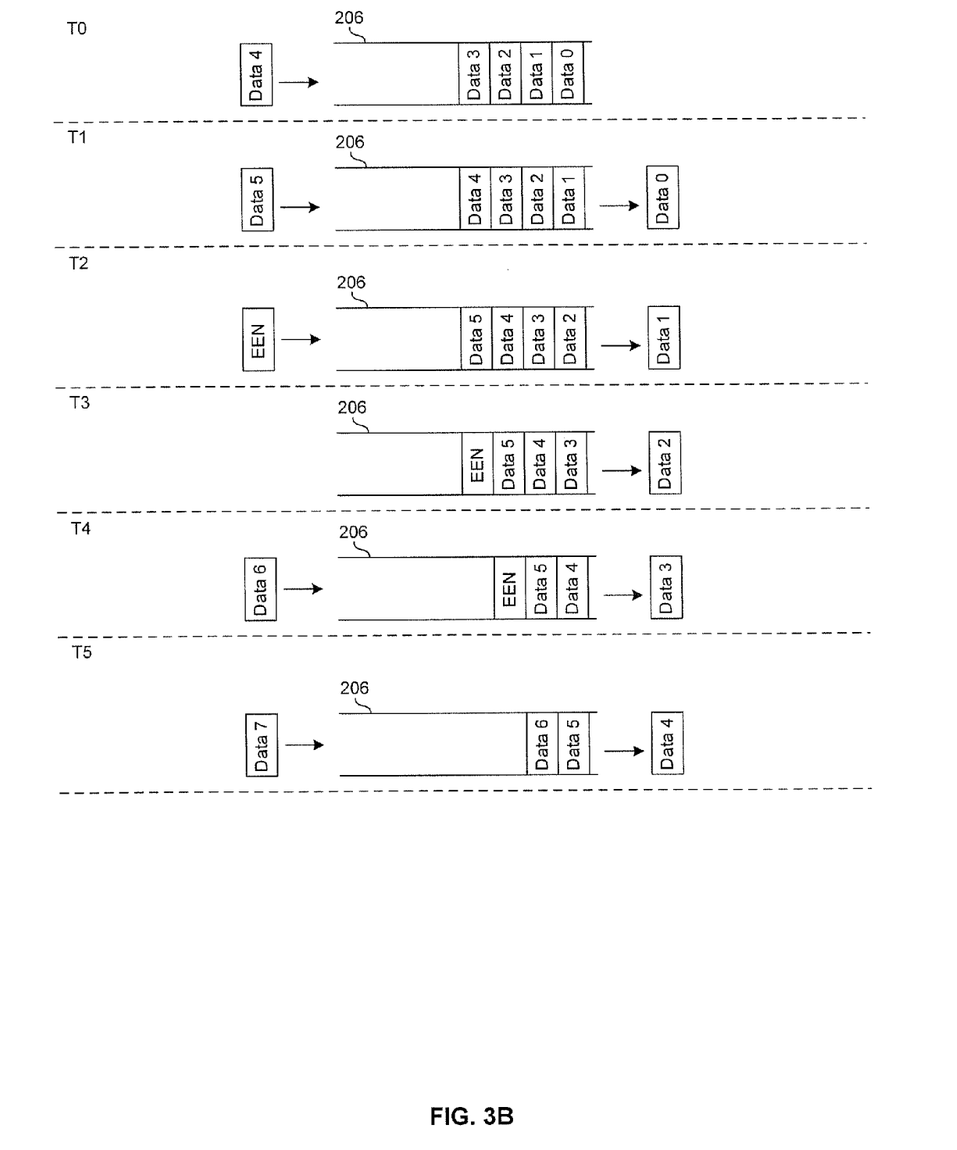

Referring to FIG. 3B, there is shown the transmit queue 206 of the network device 200 during a series of time instants T0 to T7. At time instant T0, there may be some packets in the transmit queue 206 and a new packet may arrive at the transmit queue 206. At time instant T1, a packet may be transmitted out of the transmit queue 206 and another data packet may arrive at the transmit queue 206. From time T1 to T2, no new data packets may arrive at the transmit queue 206 and the EEN module 202 may decide, based on the EEN control policy, to transition to an energy-saving mode. Accordingly, the EEN trigger may be placed in the transmit queue 206. However, at time instant T4 an event may occur that may cause the EEN module 202, based on the EEN control policy, to cancel the transition. For example, the EEN module 202 may detect activity at higher layer (e.g., PCI bus activity) and anticipate data to be transmitted, or, as shown, a new data packet may arrive at the transmit queue 206. Accordingly, the EEN trigger may be deleted from the queue 206, the new data may be placed in the transmit queue 206, and transmission may continue uninterrupted. In this manner, latencies and power consumption associated with transitioning into the energy-saving mode and the transitioning out of the energy-saving mode may be avoided.

It should be recognized that although events may be communicated via the transmit and/or receive queue, the invention is not so limited. Accordingly, in some embodiments of the invention, a separate queue such as an event or command queue, and/or an interrupt mechanism may be utilized without departing from the spirit and/or scope of the invention.

Figure 3C:
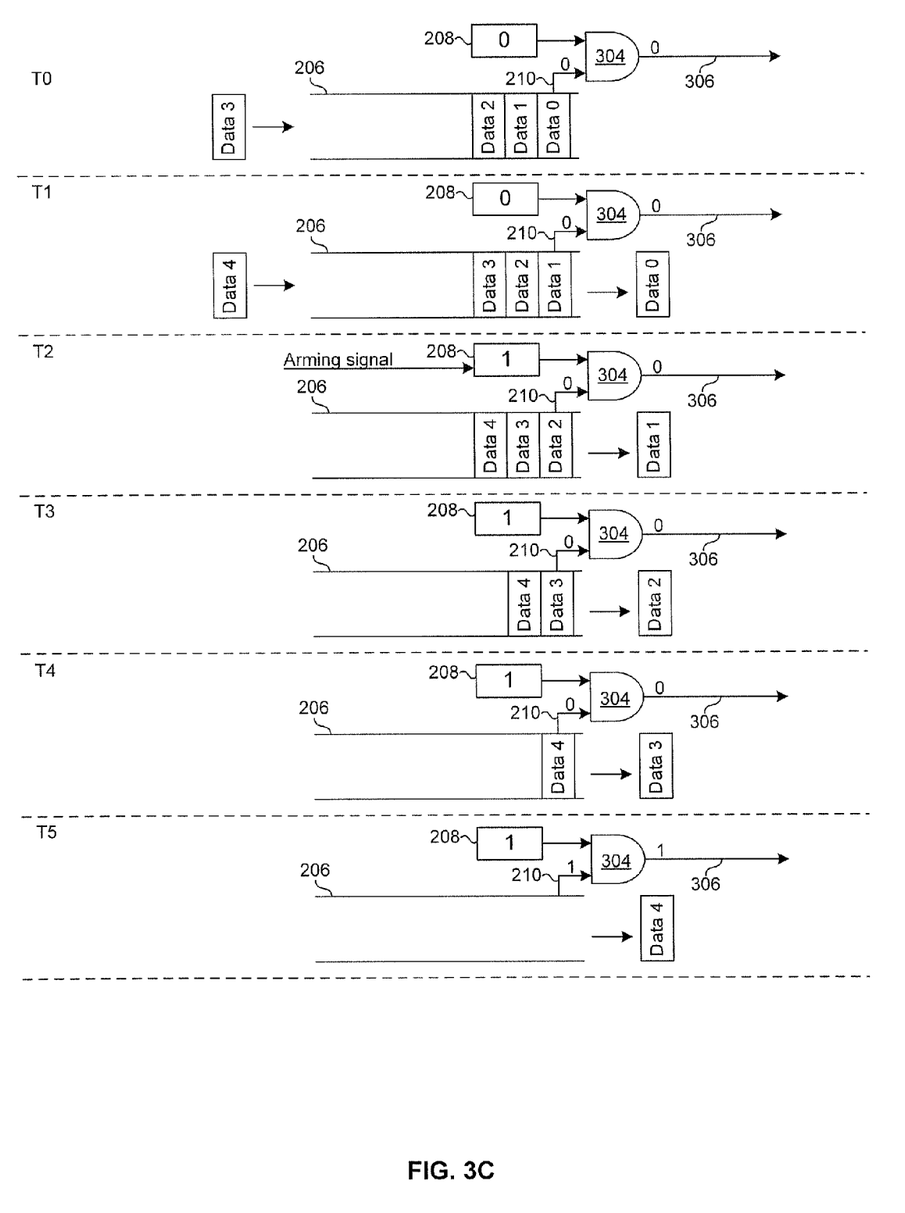
FIGS. 3C and 3D are block diagrams illustrating managing EEN transitions via a discrete EEN trigger, in accordance with an embodiment of the invention.
Figure 3D:
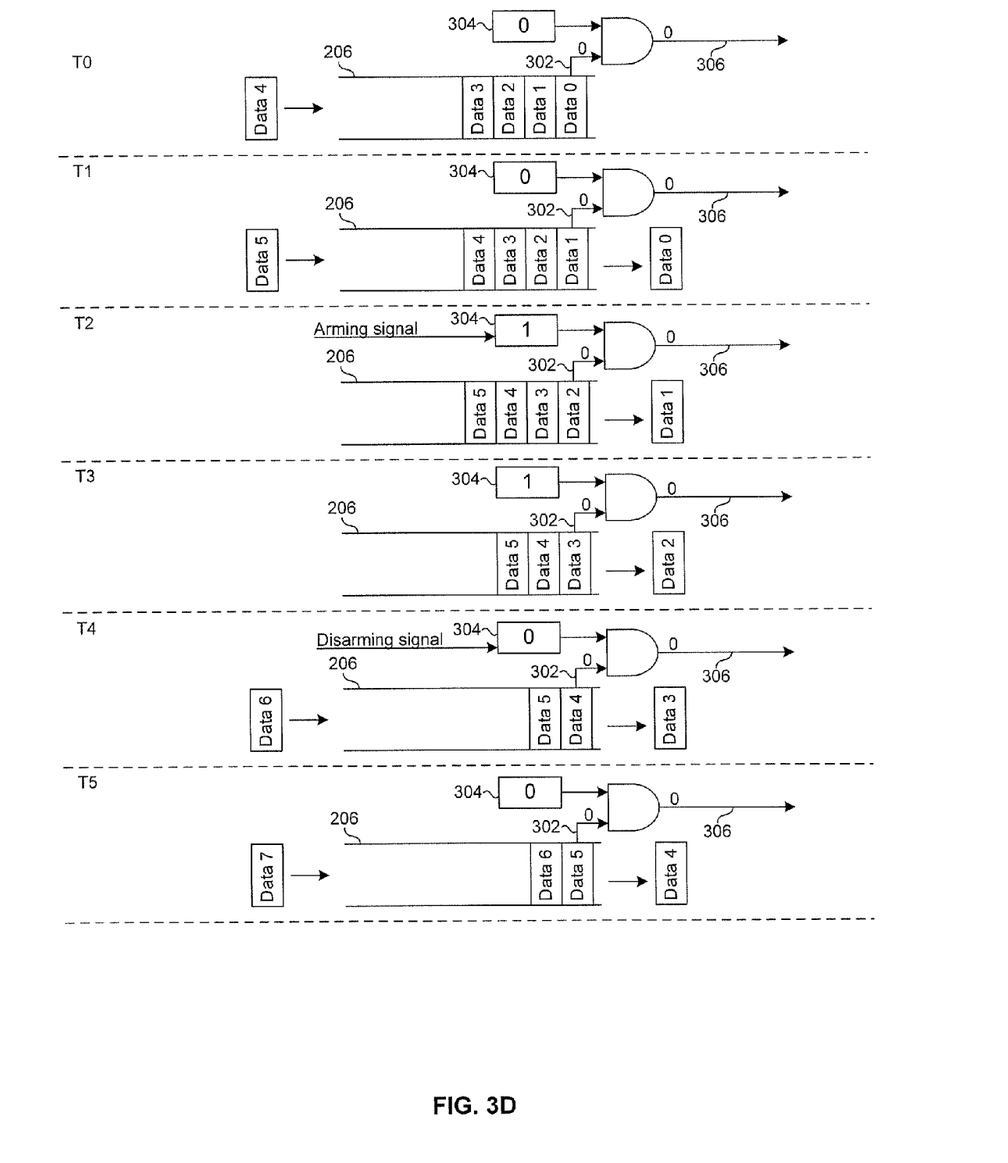

FIGS. 3C and 3D are block diagrams illustrating managing EEN transitions via a discrete EEN trigger, in accordance with an embodiment of the invention. Shown in FIGS. 3C and 3D are the transmit queue 206, the register 208, and the queue monitor signal 210 of the network device 200 described with respect to FIG. 2. Also shown is a logic gate 304, which is depicted as an 'AND' gate but which is not restricted to any particular gate or logic block. In this regard, the 0's and 1's depicted in FIGS. 3C and 3D are merely illustrative and actual embodiments may utilize different signals.

Referring to FIG. 3C, there is shown the network device 200 during a series of time instants T0 to T5. At time instant T0, there may be some packets in the transmit queue 206 and a new packet may arrive at the transmit queue 206. The contents of the register 208 may be a logic 0 which may correspond to the EEN trigger being unarmed.

At time instant T1, a packet may be transmitted out of the transmit queue 206 and another data packet may arrive at the transmit queue 206. The EEN trigger may remain unarmed.

From time T1 to T2, no new data packets may arrive at the transmit queue 206 and the EEN module 202 may decide, based on the EEN control policy, to transition to an energy-saving mode. Accordingly, at time instant T2 the EEN trigger may be armed by storing a logic 1 to the register 208.

At each of time instants T3, T4, and T5 a packet may be transmitted out of the transmit queue 206. Accordingly, at time instant T5 the transmit queue may be empty and the signal 210 may be asserted. Consequently, both inputs to the gate 304 may be logic 1 and the EEN trigger 306 may be asserted. Assertion of the EEN trigger 306 may initiate the transition to an energy-saving mode, Referring to FIG. 3D, there is shown the network device 200 during a series of time instants T0 to T5. At time instant TO, there may be some packets in the transmit queue 206 and a new packet may arrive at the transmit queue 206. The contents of the register 208 may be a logic 0 which may correspond to the EEN trigger being unarmed.

At time instant T1, a packet may be transmitted out of the transmit queue 206 and another data packet may arrive at the transmit queue 206. The EEN trigger may remain unarmed.

From time T1 to T2, no new data packets may arrive at the transmit queue 206 and the EEN module 202 may decide, based on the EEN control policy, to transition to an energy-saving mode. Accordingly, at time instant T2 the EEN trigger may be armed by storing a logic 1 to the register 208. However, at time instant T4 an event may occur that may cause the EEN module 202, based on the EEN control policy, to cancel the transition. For example, the EEN module 202 may detect activity at higher layer (e.g., PCI bus activity) and anticipate data to be transmitted, or, as shown, a new data packet may arrive at the transmit queue 206. Accordingly, the EEN trigger may be disarmed by storing 0 to the register 208 and the new data may be placed in the transmit queue 206, and transmission may continue uninterrupted. In this manner, latencies and power consumption associated with transitioning into the energy-saving mode and the transitioning out of the energy-saving mode may be avoided.

Figure 4:
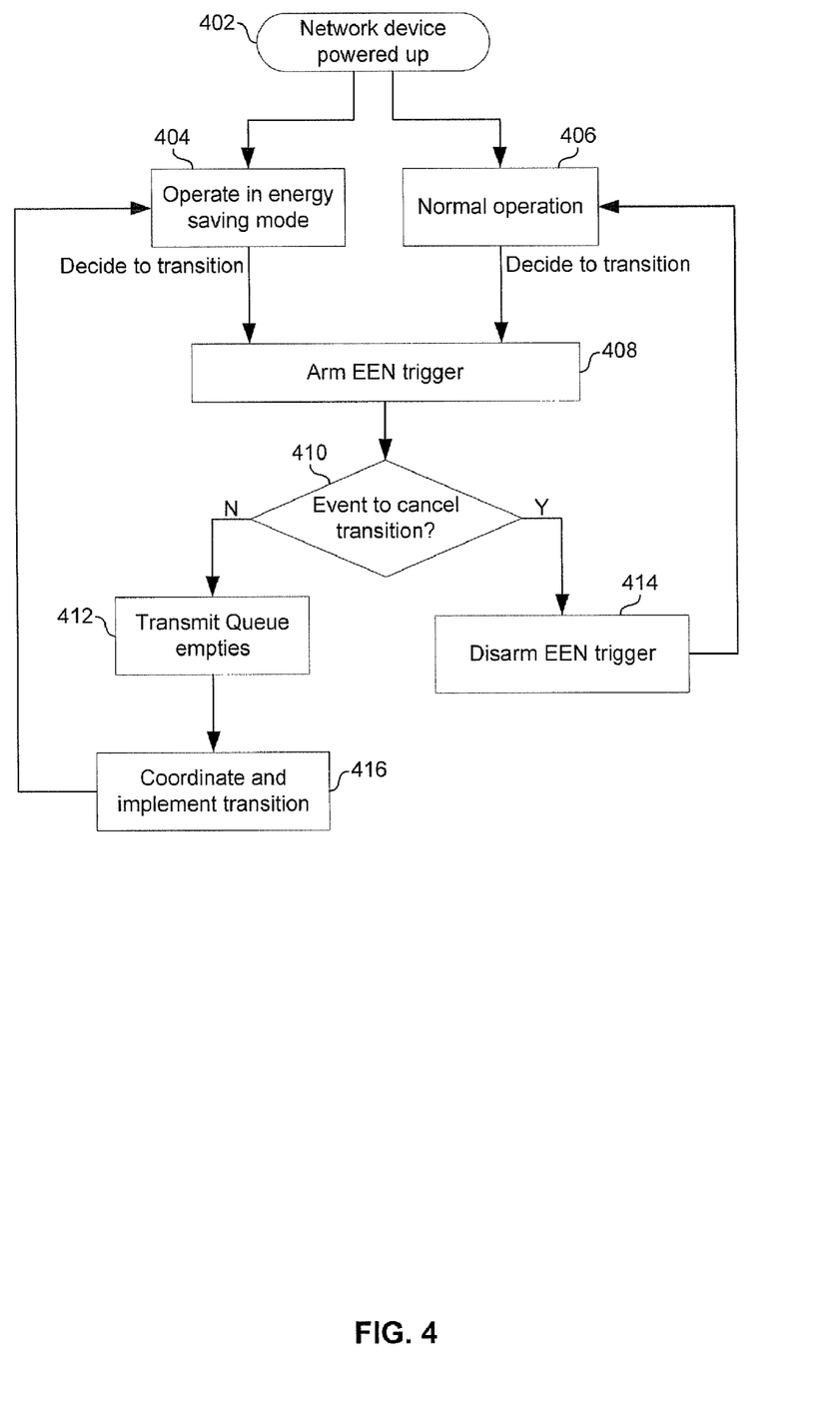
FIG. 4 is a flow chart illustrating exemplary steps for managing a transmission queue to support energy efficient networking, in accordance with an embodiment of the invention.

FIG. 4 is a flow chart illustrating exemplary steps for managing a transmission queue to support energy efficient networking, in accordance with an embodiment of the invention. Referring to FIG. 4, the exemplary steps may begin with step 402 when the network device 200 is powered up and establishes a connection with a link partner. In instances that the device 200 powers up in an energy-saving mode, the exemplary steps may advance to step 404, otherwise the steps may advance to step 406.

In step 404, the network device 402 may operate in an energy-saving mode. For example, the network device 402 may be in a low power idle mode. While in an energy-saving mode, an event may occur that may prompt, based on the EEN control policy, the network device to transition out of the energy-saving mode. Upon deciding to transition out of the energy-saving mode, the exemplary steps may advance to step 408.

In step 406, the network device may operate in a normal mode of operation. In this regard, "normal" may refer to one or more modes of operation where latencies are reduced compared to an energy-saving mode. While in a normal mode of operation, an event may occur that may prompt, based on the EEN control policy, the network device to transition into an energy-saving mode. Upon deciding to transition into the energy-saving mode, the exemplary steps may advance to step 408.

In step 408, the network device 200 may arm an EEN trigger. In this regard, in some embodiments of the invention, the network device 200 may insert an EEN trigger into the transmit queue 206. In other embodiments of the invention, the network device 200 may set a flag or one or more bits in a register. Subsequent to step 408, the exemplary steps may advance to step 410.

In step 410, while the EEN trigger is armed, but before the transmit queue 206 becomes empty, the network device 200 may monitor one or more signals and/or conditions to detect an event which may cause the scheduled transition to be undesirable. In instances that such an even occurs, the exemplary steps may advance to step 414.

In step 414, the EEN trigger may be disarmed by removing the EEN trigger from the transmit queue 206 prior to it being read out of the queue 206 and/or de-assert a flag or one or more bits of a register prior to the queue 206 becoming empty. In this manner, the transition may be preempted. Subsequent to step 414, the exemplary steps may return to the previously described step 406.

Returning to step 410, in instances that no event occurs that causes the transition to be undesirable, the exemplary steps may advance to step 412 when the EEN trigger is read out of the transmit queue 206 and/or is asserted upon the transmit queue becoming empty. Subsequent to step 412, the exemplary steps may advance to step 416.

In step 416, the network device 200 may coordinate and/or implement the transition into or out-of the energy-saving mode. Coordination may comprise the network device 200 exchanging messages with its link partner(s). Implementing may comprise generating one or more signals to reconfigure one or more portions of the network device 200. Subsequent to step 416, the exemplary steps may return to the previously described step 404.

Aspects of a method and system for queue management for energy efficient networking are provided. In an exemplary embodiment of the invention, a network device 200 may determine whether to transition into or out-of an energy-saving mode of operation and arm an EEN trigger by buffering an EEN trigger 216 in the queue 206 or setting a flag which may comprise one or more bits of the register 208. The network device 200 may transition into or out-of the energy-saving mode upon the EEN trigger being read from the queue 206 or upon the queue 206 becoming empty while the trigger is armed. Upon the occurrence of an event meeting one or more criteria prior to the EEN trigger 216 being read from the queue 206 or prior to the queue 206 being empty, the EEN trigger may be disarmed. The network device may disarm the EEN trigger by deleting the EEN trigger 216 from the queue and/or by resetting the flag in the register 208. The event may comprises data to-be-transmitted being added to the queue 206 subsequent to the EEN trigger being armed but prior to the EEN trigger 216 being read from the queue 206 or the queue 206 becoming empty. The EEN trigger may comprise a packet or portion of a packet and/or packets already buffered in the queue 206 may be modified to comprise the EEN trigger. The queue 206 may be integrated within a PHY 110 of the network device 200. The queue 206 may comprise a transmit queue or a dedicated event queue.

Whether to transition into or out-of the energy-saving mode may be determined based a value of one or more timers 204 within the network device 200. Whether to transition into or out-of the energy-saving mode may be determined based on one or more of: a type of information communicated to and/or from the network device 200, an amount of time since the network device 200 received data, an amount of time since the network device 200 transmitted data, applications running on the network device 200, and time until a next transmission and/or reception by the network device 200. The energy-saving mode may comprise a low power idle mode and/or a sub-rating PHY mode in which the network device 200 may communicate a less than a negotiated maximum data rate.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for queue management for energy efficient networking.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method in a network device, the method comprising:
   determining, by an energy efficiency control policy module in said network device, whether to transition at least part of said network device into an energy-saving mode of operation;
   electronically storing an energy efficiency trigger in a transmission queue used for buffering data for transmission by said network device;
   deleting said energy efficiency trigger from said transmission queue upon an addition of a new entry into said transmission queue that occurs prior to said energy efficiency trigger being read from said transmission queue; and
   initiating said transition or said at least part of said network device into said energy-saving mode of operation upon said transmission queue becoming empty and said energy efficiency trigger being read from said transmission queue.

2. The method according to claim 1, comprising determining whether to transition into said energy-saving mode based on a value of one or more timers within said network device.

3. The method according to claim 1, wherein said transmission queue is integrated within a PHY of said network device.

4. The method according to claim 1, comprising determining whether to transition into said energy-saving mode based on one or more of:
   a type of information communicated from said network device,
   an amount of time since said network device received data, applications running on said network device, and
   a time until a next transmission by said network device.

5. The method according to claim 1, wherein said energy efficiency trigger comprises a packet or a portion of a packet.

6. The method according to claim 1, comprising buffering said energy efficiency trigger in said transmission queue by modifying one or more packets already buffered in said transmission queue such that said modified packet or packets comprises said energy efficiency trigger.

7. The method according to claim 1, wherein said energy-saving mode comprises a low power idle mode.

8. The method according to claim 1, wherein said energy-saving mode comprises a sub-rating mode in which said network device communicates at less than a negotiated maximum data rate.

9. A system for networking, the system comprising:
   one or more processors and/or circuits for use in a network device, wherein said one or more processors:
   determine whether to transition into an energy-saving mode of operation;
   storing an energy-efficiency trigger in a transmission queue used for buffering data for transmission by said network device;
   deleting said energy efficiency trigger from said transmission queue upon an addition of a new entry into said transmission queue occurring prior to said energy efficiency trigger being read from said transmission queue; and
   initiating said transition of said network. device into said energy-saving mode of operation upon said transmission queue becoming empty and said energy efficiency trigger is read from said transmission queue.

10. The system according to claim 9, wherein said one or more processors and/or circuits determine whether to transition into said energy-saving mode based on a value of one or more timers within said network device.

11. The system according to claim 9, wherein said transmission queue is integrated within a physical layer device of said network device.

12. The system according to claim 9, wherein said one or more processors and/or circuits determine whether to transition into said energy-saving mode based on one or more of:
   a type of information communicated from said network device,
   an amount of time since said network device transmitted data applications running on said network device, and
   a time until a next transmission by said network device.

13. The system according to claim 9, wherein said energy efficiency trigger comprises a packet or a portion of a packet.

14. The system according to claim 9, wherein said one or more processors and/or circuits buffer said energy efficiency trigger in said transmission queue by modifying one or more packets already buffered in said transmission queue such that said modified packet or packets comprises said energy efficiency trigger.

15. The system according to claim 9, wherein said energy-saving mode comprises a low power idle mode.

16. The system according to claim 9, wherein said energy-saving mode comprises a sub-rating mode in which said network device communicates at less than a negotiated maximum data rate.

17. A method in a network device, the method comprising:
  determining, by an energy efficiency control policy module in said network device, whether to transition at least part of said network device into an energy-saving mode of operation;
  electronically setting an energy efficiency trigger, said energy efficiency trigger being activated upon an emptying of a queue of said network device, wherein an activation of said energy efficiency trigger upon said emptying of said queue initiates said transition;
  determining whether an event that invalidates said determination by said energy efficiency control policy that said at least part of said network device should transition into said energy-saving mode of operation occurs prior to said energy efficiency trigger being activated; and
  removing said energy efficiency trigger upon said determination that said invalidating event has occurred prior to said energy efficiency trigger being activated upon said emptying of said queue.

18. The method of claim 17, wherein said queue is one of a transmission queue and a dedicated event queue.

19. The method of claim 17, wherein said queue is integrated within a physical layer device of said network device.

20. The method of claim 17, wherein said electronically setting comprises storing a packet or a portion of a packet in said queue.

21. The method of claim 17, wherein said electronically setting comprises modifying a packet or a portion of a packet in said queue.

22. The method of claim 17, wherein said energy efficiency trigger is a discrete electronic signal.

* * * * *